United States Patent
Qi et al.

(10) Patent No.: US 6,751,390 B2
(45) Date of Patent: Jun. 15, 2004

(54) DISPERSION AND DISPERSION SLOPE COMPENSATING FIBER AND OPTICAL TRANSMISSION SYSTEM UTILIZING SAME

(75) Inventors: Gang Qi, Painted Post, NY (US); William A. Wood, Painted Post, NY (US)

(73) Assignee: Corning Incorporation, Corning, NY (US)

( * ) Notice: Subject to any disclaimer, the term of this patent is extended or adjusted under 35 U.S.C. 154(b) by 0 days.

(21) Appl. No.: 10/015,128

(22) Filed: Dec. 11, 2001

(65) Prior Publication Data
US 2003/0108317 A1 Jun. 12, 2003

(51) Int. Cl.[7] .............................. G02B 6/22; G02B 6/16
(52) U.S. Cl. ....................................... 385/127; 385/123
(58) Field of Search ................................ 385/123–128

(56) References Cited

U.S. PATENT DOCUMENTS

| | | | |
|---|---|---|---|
| 5,555,340 A | 9/1996 | Onishi et al. .............. | 385/127 |
| 5,568,583 A | 10/1996 | Akasaka et al. ............ | 385/123 |
| 5,673,354 A | 9/1997 | Akasaka et al. ............ | 385/123 |
| 5,740,297 A | 4/1998 | Onishi et al. .............. | 385/127 |
| 5,802,234 A | 9/1998 | Vengsarkar et al. ........ | 385/123 |
| 5,995,695 A | 11/1999 | Aikawa et al. ............. | 385/123 |
| 5,999,679 A | 12/1999 | Antos et al. ................ | 385/127 |
| 6,009,221 A | 12/1999 | Tsuda .......................... | 385/123 |
| 6,031,955 A | 2/2000 | Mukasa et al. ............. | 385/123 |
| 6,178,279 B1 | 1/2001 | Mukasa et al. ............. | 385/123 |
| 6,263,138 B1 | 7/2001 | Sillard et al. ............... | 385/123 |
| 6,522,819 B2 * | 2/2003 | Shimotakahara et al. ... | 385/123 |
| 2002/0012510 A1 | 1/2002 | Jiang et al. ................. | 385/123 |
| 2002/0028051 A1 * | 3/2002 | Bickham et al. ............ | 385/123 |
| 2002/0154877 A1 * | 10/2002 | Li et al. ...................... | 385/127 |
| 2002/0189296 A1 | 12/2002 | Cain et al. | |
| 2003/0059186 A1 * | 3/2003 | Hebgen et al. ............. | 385/127 |
| 2003/0099450 A1 * | 5/2003 | Wei et al. .................... | 385/127 |

FOREIGN PATENT DOCUMENTS

| | | | | |
|---|---|---|---|---|
| FR | WO 01/01177 | 1/2001 | ............ | G02B/6/16 |
| FR | EP 1 076 250 | 2/2001 | ............ | G02B/6/22 |
| GB | EP 0 598 554 | 5/1999 | ............ | H04B/10/18 |
| GB | EP 1 107 028 | 6/2001 | ............ | G02B/6/22 |
| JP | WO 00/70378 | 11/2000 | ............ | G02B/6/22 |
| WO | WO 00/67053 | 11/2000 | ............ | G02B/6/16 |

\* cited by examiner

Primary Examiner—Hemang Sanghavi
Assistant Examiner—Sarah U Song
(74) Attorney, Agent, or Firm—Randall S. Wayland (57) ABSTRACT

A dispersion and dispersion slope compensating optical fiber includes a segmented core and a cladding layer wherein the refractive index profile is selected to provide a dispersion having a maximum deviation of less than 7 ps/nm-km over a wavelength band from 1550 nm to 1610 nm. According to a further embodiment of the invention, a dispersion compensating optical fiber is provided having a refractive index profile with a central core segment having a positive relative refractive index; a depressed moat segment on a periphery of the central core segment having a relative refractive index that is more negative than −1.2%; and an annular ring segment outward from the depressed moat segment having a relative refractive index that is greater than 1.2%.

39 Claims, 5 Drawing Sheets

DISPERSION AND DISPERSION SLOPE COMPENSATING FIBER AND OPTICAL TRANSMISSION SYSTEM UTILIZING SAME

FIELD OF THE INVENTION

The invention is directed to dispersion compensation fibers for use in telecommunication systems, and more particularly, to optical fibers for compensating the dispersion and the dispersion slope of non-zero dispersion shifted fibers.

BACKGROUND OF THE INVENTION

The increased demand for higher bit transmission rates has resulted in a large demand for optical transmission systems that can control dispersion effects. A linear analysis of common optical transmission systems indicates that while transmission systems can tolerate about 1,000 ps/nm residual dispersion at 10 Gbit/second, these systems tolerate only about 62 ps/nm residual dispersion at a higher transmission rate of 40 Gbit/second. Therefore, it is apparent that it is important to accurately control the dispersion for high bit-rate transmission systems, and that this control becomes increasingly important as the transmission rate increases. Further, the need to accurately control dispersion means that dispersion slope of a transmission fiber must also be compensated as transmission rates approach 40 Gbit/second.

Various solutions have been proposed to achieve the low dispersion and dispersion slope values required for compensating non-zero dispersion shifted fibers, including: photonic crystal fibers, higher order mode dispersion compensation, dispersion compensating gratings and dual fiber dispersion compensating techniques. Each of these solutions has significant drawbacks associated therewith.

Photonic crystal fibers are designed to have a large negative dispersion and a negative dispersion slope that are close to those required for compensating non-zero dispersion shifted fibers. However, photonic crystal fibers have significant drawbacks including a relatively small effective area of about 10 $\mu m^2$ or less that leads to unacceptably high splice losses and hence require the use of a transition or bridge fiber to reduce splice losses. In addition, due to the very nature of photonic crystal fibers, i.e. glass/air interfaces in the core of the fiber, the related attenuation is unacceptable in the transmission window of interest due. Further, photonic crystal fibers are significantly difficult to manufacture on a large scale and are, therefore, expensive.

Higher order dispersion mode compensation relies on the dispersion properties of higher order modes in the fiber. It has been demonstrated that higher order modes, e.g. $LP_{02}$ and $LP_{11}$, have higher negative dispersions and dispersion slopes than fundamental modes. Higher order mode dispersion compensation typically relies on the conversion of a transmitted fundamental mode to one of the higher order modes via a mode converter. Subsequently, this higher order mode is propagated in a fiber. After a finite distance, the higher order mode is converted back to the fundamental mode via a second mode converting device. Problems associated with higher order mode dispersion compensation solutions include inefficient mode converters and the difficulty of producing intermediate fibers that allow higher order mode transmission while resisting coupling to the fundamental mode.

Dispersion compensating gratings are utilized to achieve a required differential group delay via chirped gratings. Techniques utilizing dispersion compensating gratings have been shown to be useful only for narrow bands, as these techniques typically suffer from dispersion and dispersion slope ripple when the required grating length becomes large.

Dual fiber dispersion compensating solutions for non-zero dispersion shifted fibers are similar to the dispersion compensating gratings techniques described above in that the dispersion compensation and the slope compensation are separately treated. Typically, dual fiber dispersion compensating techniques include the use of a dispersion compensation fiber followed by a dispersion slope compensation fiber. Such solutions require the use of a dispersion slope compensation fiber that compensates for a relatively small dispersion slope. Extensive profile modeling of optical fibers has resulted in well-established correlation between dispersion slope, effective area and bend sensitivity. By increasing the role played by waveguide dispersion in a given fiber, it is possible to decrease the slope and even create a negative slope in some cases. However, as the effective area is decreased, the bend sensitivity of the fiber is increased. Effective area of the fiber can be increased at the expense of further degradation of the bend sensitivity. Decreasing the dispersion slope, or making the dispersion slope negative, results in working very close to the cut-off wavelength of the fundamental mode, which in turn makes the fiber more bend sensitive and results in greater signal loss at long wavelengths, i.e., wavelengths greater than 1560 nm. As a result of these relationships, it is extremely difficult to manufacture a viable compensation fiber that compensates both dispersion and dispersion slope.

Heretofore, the most viable broad band commercial technology available to reduce or eliminate dispersion has been dispersion compensation fiber modules. As dense wavelength division multiplexing deployments increase to 16, 32, 40 and more channels, broadband dispersion compensating products are desired. Telecommunication systems presently include single-mode optical fibers which are designed to enable transmission of signals at wavelengths around 1550 nm in order to utilize the effective and reliable erbium-doped fiber amplifiers currently available.

With continuing interest in higher bit-rate information transfer, i.e. greater than 40 Gbit/second, ultra-long reach systems, i.e., systems greater than 100 km in length, and optical networking, it has become imperative to use dispersion compensation fibers in networks that carry data on non-zero dispersion shifted fibers. One such fiber is LEAF® optical fiber, manufactured by and available from Coming, Inc. of Coming, N.Y. LEAF® fiber is a positive non-zero dispersion shifted fiber that has become the optical fiber of choice for many new systems due to its inherently low dispersion and economic advantage over conventional single mode fibers. The dispersion curve for LEAF® fiber is very linear as a function of wavelength over the C and L wavelength bands, with a zero-dispersion wavelength of around 1501 nm. The linearity of the dispersion relation makes broadband dispersion compensation difficult, since the dispersion curves of prior art dispersion compensation fibers are only approximately linear. Specifically, the profiles of prior art dispersion compensation fibers previously used to compensate LEAF® fiber each suffer from rather severe dispersion curvature as a function of wavelength that limits their application bandwidth.

The combination of the early versions of dispersion compensation fibers with non-zero dispersion shifted fibers effectively compensated dispersion at only one wavelength. However, higher bit-rates, longer reaches and wider bandwidths require dispersion slope to be more precisely compensated over broad ranges of wavelength. Consequently, it is desirable for the dispersion compensation fiber to have dispersion characteristics such that its dispersion and dispersion slope are matched to that of the transmission fiber it is required to compensate over broad wavelength ranges. The dispersion and dispersion slope matching characteristic described above is also indicative of multiple dispersion compensation fiber systems.

Thus, it should be recognized that there is a need to compensate dispersion across the entire wavelength band of operation and not just at wavelengths near the center of the band as is common with many of the solutions currently being employed. Therefore, it would be desirable to develop an alternative dispersion compensating fibers and transmission systems having the ability to compensate for dispersion and dispersion slope of non-zero dispersion shifted fibers and other positive dispersion optical fibers over a wide wavelength band.

SUMMARY OF THE INVENTION

The present invention relates to a dispersion compensating fiber that compensates for dispersion and dispersion slope of a non-zero dispersion shifted fiber (NZDSF). The methods and apparatus disclosed herein enable accurate and substantially complete compensating for dispersion and dispersion slope in a NZDSF across a wide wavelength band.

One embodiment of the present invention relates to a dispersion and dispersion slope compensating optical fiber that includes a segmented core and a cladding layer on the periphery of the core, wherein the fiber's refractive index profile is selected to provide a dispersion having a maximum deviation of less than 7 ps/nm-km within a wavelength band of from about 1550 nm to about 1610 nm; more preferably, a maximum deviation of less than 5 ps/nm-km within the wavelength band of from about 1550 nm to about 1610 nm. The DC fiber preferably exhibits a fundamental mode bend loss of less than or equal to 0.01 dB/km within the wavelength band of from about 1550 nm to about 1610 nm. Preferably also, the DC fiber according to the invention exhibits an effective area greater than or equal to 17 $\mu m^2$ at 1580 nm. The DC fiber in accordance with the invention preferably exhibits a total dispersion more negative than −50 ps/nm-km at 1550 nm; preferably more negative that −75; and more preferably more negative that −120 ps/nm-km. The DC fiber in accordance with the invention preferably exhibits a total dispersion slope more negative that −2 ps/nm²-km at 1580 nm.

In a first preferred embodiment, a segmented core of the dispersion compensating fiber includes a central core segment having a relative refractive index, a depressed moat segment on the periphery of the central core segment and having a relative refractive index that is less than the relative refractive index of the core segment, and an outer radius. The segmented core also preferably includes an intermediate segment on the periphery of the depressed moat segment and having a relative refractive index that is less than the relative refractive index of the central core segment and greater than the relative refractive index of the depressed moat segment, and an outer radius. The segmented core preferably further includes an annular ring segment on the outward of the moat and preferably located on the periphery of the intermediate segment and having a relative refractive index that is greater than the relative refractive index of the intermediate segment, and a width.

In a second preferred embodiment, the segment core of the dispersion compensating fiber includes a central core segment having a relative refractive index, and a depressed moat segment on the periphery of the central core segment and having a relative refractive index that is less than the relative refractive index of the central core segment, and an outer radius. The segmented core preferably also includes a first intermediate segment on the periphery of the depressed moat segment and having a relative refractive index that is less than the relative refractive index of the central core segment and greater than the relative refractive index of the depressed moat segment, and an outer radius, and an annular ring segment on the periphery of the first intermediate segment and having a relative refractive index that is greater than the relative refractive index of the first intermediate segment and less than the relative refractive index of the central core segment, and a width. The segmented core further preferably includes a second intermediate segment on the periphery of the ring segment and having a relative refractive index that is less than the relative refractive index of the central core segment and greater than the relative refractive index of the moat segment, and an outer radius, and a gutter segment on the periphery of the second intermediate segment and having a relative refractive index that is less than the relative refractive index of the second intermediate segment and greater than the relative refractive index of the depressed moat segment, and an outer radius. The segmented core still further includes an outer clad on the periphery of the gutter segment and having a relative refractive index that is greater than the relative refractive index of the moat segment and less than the relative refractive index of the second intermediate segment.

According to a further embodiment, a dispersion compensating optical fiber is provided having a refractive index profile with a central core segment having a positive relative refractive index; a depressed moat segment on a periphery of the central core segment and having a relative refractive index that is more negative that −1.2%; and an annular ring segment outward from the depressed moat segment and having a relative refractive index that is greater than 1.2%.

The present invention also includes optical communication systems employing dispersion compensation fibers and modules in accordance with the embodiments described above.

Additional features and advantages of the invention will be set forth in the detailed description which follows and will be apparent to those skilled in the art from the description or recognized by practicing the invention as described in the description which follows, together with the claims and appended drawings.

It is to be understood that the foregoing description is exemplary of the invention only and is intended to provide an overview for understanding the nature and character of the invention as it is defined in the claims. The accompanying drawings are included to provide a further understanding of the invention and are incorporated and constitute part of this specification. The drawings illustrate various features and embodiments of the invention, which, together with their description serve to explain the principles and operation of the invention.

DETAILED DESCRIPTION OF THE PREFERRED EMBODIMENT

For purposes of the description herein, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting unless the claims expressly state otherwise.

Definitions

The following definitions and terminology are commonly used in the art.

The radii of the segments of the core is defined in terms of the index of refraction of the material of which the segment is made. A particular segment has a first and a last refractive index point. A central segment has an inner radius of zero because the first point of the segment is on the center line. The outer radius of the central segment is the radius drawn from the waveguide center line to the last point of the refractive index of the central segment. For a segment having a first point away from the center line, the radius of the waveguide center line to the location of its first refractive index point is the inner radius of that segment. Likewise, the radius from the waveguide center line to the location of the last refractive index point of the segment is the outer radius of that segment.

The segment radii may be conveniently defined in a number of ways. In this application, radii are defined in accord with the figures, described in detail below.

The definitions of segment radius and refractive index, used to describe refractive index profile, in no way limit the invention.

The effective area is generally defined as, $$A_{eff} = 2\pi (\int E^2 r dr)^2 / (\int E^4 r dr),$$

wherein the integration limits are 0 to $\infty$, and E is the electric field associated with the propagated light.

The relative refractive index of a segment, $\Delta\%$, as used herein, is defined by the equation, $$\Delta\% = 100 \times (n_i^2 - n_c^2)/2n_c^2,$$

where $n_i$ is the maximum refractive index of the index profile segment denoted as i, and $n_c$, the reference refractive index, is taken to be the refractive index of the clad layer. Every point in the segment has an associated relative index. The maximum relative index is used to conveniently characterize a segment whose general shape is known.

The term relative refractive index profile or index profile is the relation between $\Delta\%$ or refractive index and radius over a selected segment of the core.

The bend resistance of a waveguide fiber is expressed as induced attenuation under prescribed test conditions. In the present application, bend loss was measured by winding the present inventive compensating fiber about a hub having a 4 inch diameter.

The relationship between a transmission fiber and a dispersion compensating fiber that substantially completely compensates for the dispersion of the transmission fiber at a particular wavelength follows the general equation of:

$$D_{DC}(\lambda) L_{CD} = -D_T(\lambda) L_T,$$

wherein $D_{DC}(\lambda)$ is the dispersion of the dispersion compensating fiber at a particular wavelength, $L_{DC}$ is the length of the dispersion compensating fiber, $D_T(\lambda)$ is the dispersion of the transmission fiber at a particular wavelength, $\lambda$ is a particular wavelength in the optical transmission band, and $L_T$ is the length of the transmission fiber (e.g., a NZDSF). From the foregoing it should be recognized that for compensation over a broad wavelength range, the equation above must hold substantially true over the wavelength range of interest.

The desired relationship of the k of the optical fibers in a transmission line is as follows:

$$\kappa_{DC}(\lambda) = \frac{D_{DC}}{S_{DC}} = \kappa_T(\lambda) = \frac{D_T}{S_T},$$

wherein $K_{DC}(\lambda)$ is the κ value for the dispersion compensating fiber, $D_{DC}$ is the dispersion for the dispersion compensating fiber, $S_{DC}$ is the dispersion slope for the dispersion compensating fiber, $K_T(\lambda)$ is the κ value for the transmission fiber, $D_T$ is the dispersion for the transmission fiber, and $S_T$ is the dispersion slope for the transmission fiber.

Figure 1:
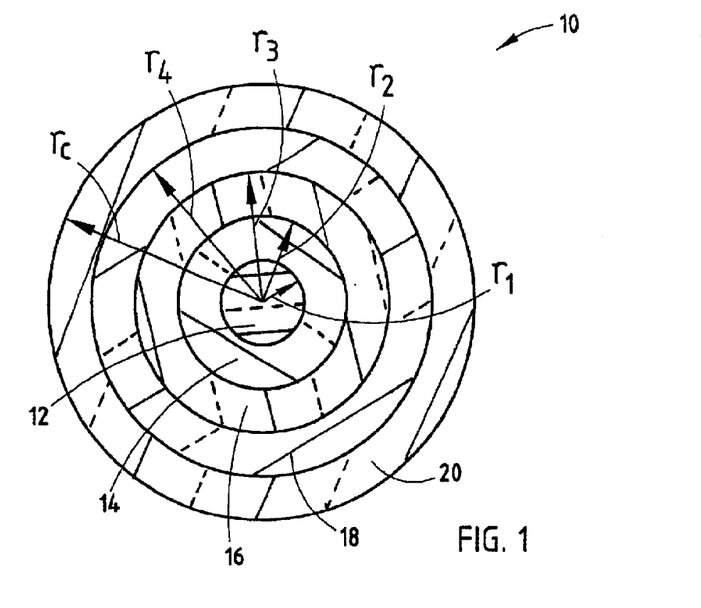
FIG. 1 is a schematic cross-sectional end view of an DC fiber embodying the present invention.

The dispersion compensating (DC) fiber according to the invention described and disclosed herein has a generally segmented structure, as shown in FIG. 1. Each of the segments is described by a refractive index profile having a relative refractive index percent, $\Delta_i$, and an outside radius, $r_i$. The subscript i for r and $\Delta$ refers to a particular segment. The segments are numbered $r_1$ through $r_c$ beginning with the innermost segment that includes the fiber's longitudinal axis center line. A clad layer having a refractive index of $n_c$ surrounds the DC fiber. In the example illustrated in FIG. 1, a DC fiber 10 includes a central core segment 12 having an outer radius $r_1$, a depressed moat segment 14 surrounding the central core segment and having an outer radius $r_2$, an intermediate segment 16 having an outer radius $r_3$, an annular ring segment 18 outward from the moat segment and intermediate segment having an outer radius $r_4$, and a cladding layer 20 having an outer radius $r_c$. The illustrated radii dimensions of the DC fiber 10 in FIG. 1 are exaggerated for clarity and, thus, are not drawn to scale.

Preferably, central core and annular ring segments 12 and 18 are formed using germanium-doped $SiO_2$, although other forms of index of refraction increasing dopants may also be employed to achieve the DC fibers disclosed herein, so long as the same general refractive profile is achieved. Likewise, depressed moat segment 14 is preferably formed using fluorine-doped $SiO_2$, however, other index of refraction decreasing dopants may be employed besides fluorine, such as $B_2O_3$. Cladding layer 20 is preferably formed of substantially pure silica, however, cladding layer 20 may also include index of refraction increasing or decreasing dopants, so long as the relationship between the Δ's within the refractive index profile of the associated DC fiber is maintained. Further, segments within the profile of DC fiber 10 displaying a positive relative refractive index may also include fluorine as a co-dopant therein, thereby reducing the final water content in the associated fiber segment.

Figure 2:
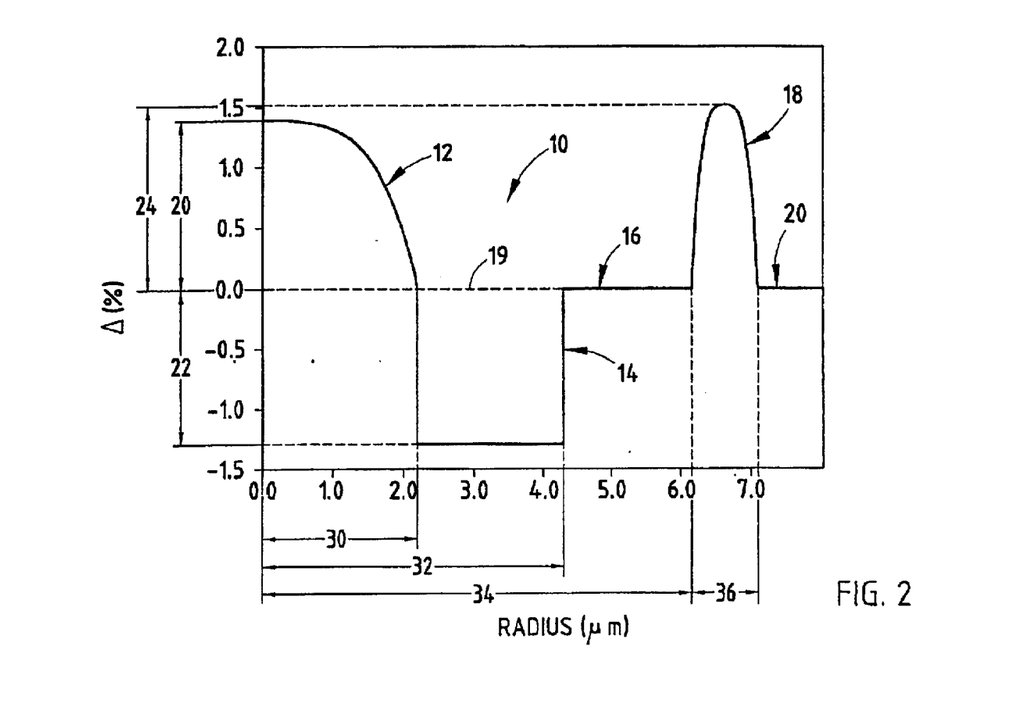
FIG. 2 is a diagram of a refractive index profile (delta % vs. radius) of a first embodiment of the DC fiber in accordance with the present invention.

A relative index profile of a first embodiment of DC fiber 10 is illustrated in FIG. 2, which shows relative refractive index percent (as compared to cladding) charted versus the DC fiber radius. Although FIG. 2 shows only four discrete segments, it is understood that the functional requirements may be met by forming a dispersion compensating (DC) fiber having more or less than four segments. However, embodiments having fewer segments are usually easier to manufacture and are therefore preferred. Further, the DC fiber 10 may be constructed via a variety of methods including, but in no way limited to, vapor axial deposition (VAD), modified chemical vapor deposition (MCVD), plasma chemical vapor deposition (PCVD), and outside vapor deposition (OVD). Preferably, the DC fiber 10 is formed by PCVD methods.

The central core segment 12 of the DC fiber 10 according to the invention has a maximum central core segment relative refractive index percent 20, $\Delta_1$, of greater than 1.1% and preferably within the range of from about 1.1% to about 1.7%; more preferably within the range of from about 1.26% to about 1.54%; and most preferably within the range of from about 1.33% to about 1.47%. Central core segment 12 also has an outer radius 30, $r_1$, within the range of from about 1.7 μm to about 2.7 μm; more preferably within the range of from about 1.98 μm to about 2.42 μm; and most preferably within the range of from about 2.09 μm to about 2.31 μm. The radius 30, $r_1$, is defined by the intersection of the profile of central core segment 12 with the horizontal axis 19 corresponding with the profile of cladding layer 20, i.e., Δ%=0 as a reference.

The depressed moat segment 14 of DC fiber 10 is formed on the outer periphery of core segment 12 and has a minimum moat relative refractive index percent 22, $\Delta_2$, of within the range of from about −0.6% to about −0.9%; more preferably within the range of from about −1.43% to about −1.00%; and most preferably within the range of from about −1.37% to about −1.23%. Further embodiments of the invention include a minimum moat (at its deepest point) relative refractive index percent 22, $\Delta_2$, more negative that −1.2%. Moat segment 14 has an outer radius 32, $r_2$, within the range of from about 3.4 μm to about 5.2 μm; more preferably within the range of from about 3.87 μm to about 4.73 μm; and most preferably within the range of from about 4.09 μm to about 4.52 μm. The outer radius 32, $r_2$, of the moat segment 14 is defined by the intersection of moat segment 14 and intermediate segment 16. In the illustrated example, the outer radius 32, $r_2$, is defined by the intersection of the profile of moat segment 14 with the horizontal axis 19 corresponding with the profile of cladding layer 20, i.e., Δ%=0 as a reference.

The intermediate segment 16 of DC fiber 10 may be formed on the outer periphery of the moat segment 14 and has a relative refractive index percent, $\Delta_3$, within the range of from about −0.1% to about 0.1%; and more preferably within the range of from about 0.0% to about 0.1%. Intermediate segment 16 also has an outer radius 34, $r_3$, within the range of from about 4.9 μm to about 7.5 μm; more preferably within the range of from about 5.58 μm to about 6.82 μm; and most preferably within the range of from about 5.89 μm to about 6.51 μm. The outer radius 34, $r_3$, is the intersection of intermediate segment 16 and ring segment 18. As illustrated in FIG. 2, the outer radius 34, $r_3$, is defined by the intersection of the profile of ring segment 18 with horizontal axis 19 corresponding with the profile of cladding layer 20, i.e., Δ%=0 as a reference.

The annular ring segment 18 of the DC fiber 10 is formed outward of the moat segment 14 and preferably on the periphery of intermediate segment 16 and has a maximum relative refractive index percent 20, $\Delta_4$, within the range of from about 1.0% to about 1.9%; more preferably greater than 1.2%; and preferably of within the range of from about 1.40% to about 1.71%; and most preferably within the range of from about 1.47% to about 1.63%. Ring segment 18 also has a width 36 within the range of from about 0.7 μm to about 1.2 μm; more preferably of within the range of from about 0.86 μm to about 1.05 μm; and most preferably within the range of from about 0.90 μm to about 1.00 μm. The width 36 of ring segment 18 is defined by the distance between the two points of intersection between the profile of ring segment 18 with horizontal axis 19 corresponding with the profile of cladding layer 20, i.e., Δ%=0 as a reference.

The outer radius, $r_4$, of ring segment 18 is also the inner radius of cladding layer 20. Cladding layer 20 surrounds ring segment 18 and has a relative refractive index percent, $\Delta_c$ of approximately 0%, and an outer radius, $r_c$, of about 62.5 μm. A coating (not shown) is typically applied to the periphery of the DC fiber 10 and may comprise a two-modulus coating as is conventional, or any other suitable coating.

Figure 3:
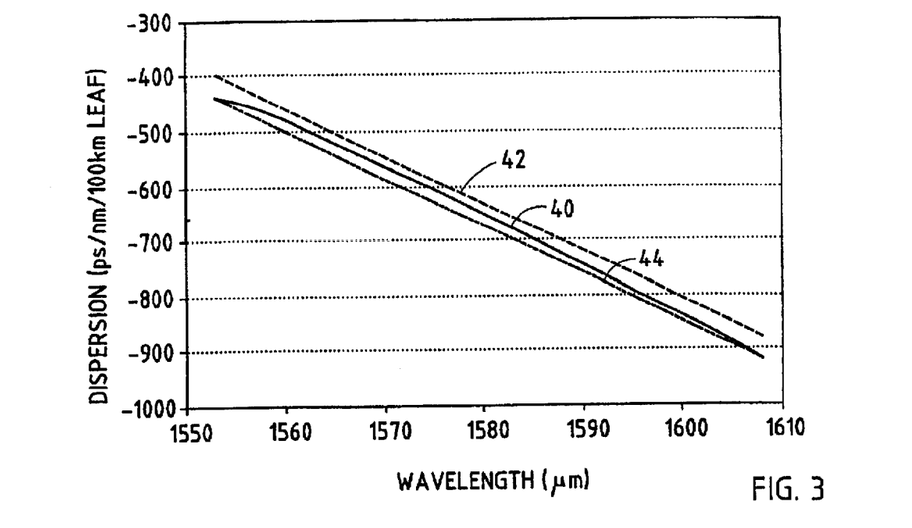
FIG. 3 is a plot of dispersion vs. wavelength of a system including a 100 km length of NZDSF an embodiment of the DC fiber in accordance with the present invention.

As should be apparent, the DC fiber 10 of the present invention exhibits nearly linear dispersion within a wavelength band of from about 1550 nm to about 1610 nm. This overall dispersion is illustrated in FIG. 3, which illustrates the overall dispersion for a 100 km span of LEAF® versus wavelength of the signal to be compensated. Specifically, FIG. 3 shows the values for overall dispersion 40, as well as a positive overall deviation 42 and negative overall deviation 44 therefrom. As shown in the illustrated example of FIG. 3, the system has a dispersion has a overall deviation as measured from line 42 to 44 of equal to or less than 40 ps/nm-km within a wavelength band of from about 1550 nm to about 1610 nm. The linearity of the dispersion for the combination of LEAF® fiber and the DC fiber 10 in accordance with the invention illustrates significant overall matching of the dispersion slopes of LEAF® fiber with the DC fiber 10 over the wavelength range of interest.

The bend loss of the fundamental mode of the profile for the DC fiber 10 with a standard 125 micron cladding diameter is extremely small. Specifically, the calculated bend loss of DC fiber 10 on a 4-inch diameter hub within the wavelength band of within the range of from about 1550 nm to about 1610 nm is better than 0.01 dB/km.

The calculated optical properties of the DC fiber 10 of FIG. 2, are given in Table 1.

TABLE 1

| Optical Properties for Fiber of FIG. 2 | | | |
|---|---|---|---|
| Wavelength (nm) | 1550 | 1580 | 1610 |
| Dispersion (ps/nm-km) | −98 | −155 | −220 |
| Dispersion Slope(ps/nm$^2$-km) | −1.61 | −2.17 | −1.92 |
| $A_{eff}$ (μm$^2$) | 16.3 | 19.3 | 25.1 |
| $LP_{02}$ Cutoff wavelength (nm) | 1790 | 1790 | 1790 |

TABLE 1-continued

Optical Properties for Fiber of FIG. 2

| | | | |
|---|---|---|---|
| LP$_{11}$ Cutoff wavelength (nm) | 2186 | 2186 | 2186 |
| Bend loss (about 4-inch hub) (dB/km) | 5 × 10$^{-20}$ | 5.2 × 10$^{-16}$ | 3 × 10$^{-12}$ |

Figure 4:
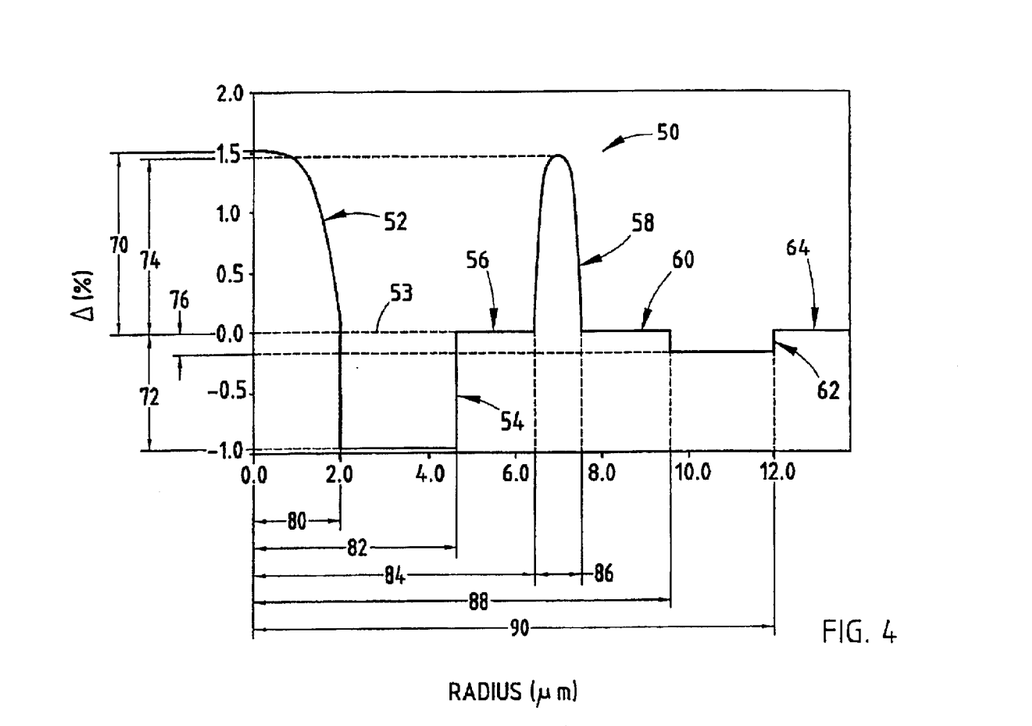
FIG. 4 is a diagram of a refractive index profile (delta % vs. radius) of another embodiment of the DC fiber in accordance with the present invention.

A relative index profile of a second embodiment of DC fiber 50 according to the invention is illustrated in FIG. 4, which shows relative refractive index percent charted versus the DC fiber radius. Although FIG. 4 shows only six discrete segments, it is understood that the function or requirements may be met by forming a DC fiber having more or less than six segments. However, embodiments having fewer segments are usually easier to manufacture and are therefore preferred. DC fiber 50 can be manufactured via the same variety of methods as DC fiber 10. Further, DC fiber 50 uses a doping scheme for the segments associated therewith similar to that of compensation fiber 10.

In the example illustrated in FIG. 4, DC fiber 50 includes a central core segment 52, a depressed moat segment 54, a first intermediate segment 56, and annular ring segment 58, a second intermediate segment 60, a gutter segment 62, and a cladding layer 64.

The central core segment 52 of DC fiber 50 has a maximum relative refractive index percent 70, $\Delta_1$, preferably within the range of from about 1.2% to about 1.8%; more preferably of within the range of from about 1.37% to about 1.67%; and most preferably of within the range of from about 1.44% to about 1.60%. Central core segment 52 also has an outer radius 80, $r_1$, within the range of from about 1.7 μm to about 2.5 μm; more preferably of within the range of from about 1.89 μm to about 2.21 μm; and most preferably within the range of from about 1.95 μm to about 2.11 μm. The radius 80, $r_1$, is defined by the intersection of the profile of central core segment 52 with the horizontal axis 53 corresponding with the profile of cladding layer 64, i.e., Δ%=0 as a reference.

The depressed moat segment 54 of the DC fiber 10 is formed on the periphery of core segment 52 and has a minimum relative refractive index percent 72, $\Delta_2$, of within the range of from about -1.2% to about -0.7%; more preferably of within the range of from about -1.05% to about -0.86%; and most preferably of within the range of from about -1.00% to about -0.90%. The depressed moat segment 54 also has an outer radius 82, $r_2$, within the range of from about 3.7 μm to about 5.5 μm; more preferably of within the range of from about 4.14 μm to about 5.06 μm; and most preferably of within the range of from about 4.37 μm to about 4.83 μm. The outer radius 82, $r_2$, of moat segment 54 is measured to the intersection of first moat segment 54 and first intermediate segment 56. In the illustrated example, the outer radius 82, $r_2$, is defined by the intersection of the profile of moat segment 54 with the horizontal axis 53 corresponding with the profile of cladding layer 64, i.e., Δ%=0 as a reference.

The first intermediate segment 56 of the DC fiber 50 is formed on the periphery of the depressed moat segment 54 and has a relative refractive index percent, $\Delta_3$, of within the range of from about -0.1% to about 0.1%; and more preferably within the range of from about 0.0% to about 0.1%. First intermediate segment 56 also has an outer radius 84, $r_3$, within the range of from about 5.1 μm to about 7.9 μm; more preferably within the range of from about 5.76 μm to about 7.04 μm; and most preferably of within the range of from about 6.08 μm to about 6.72 μm. The outer radius 84, $r_3$, is measured to the intersection of first intermediate segment 56 and ring segment 58. As illustrated, the outer radius 84, $r_3$, is defined by the intersection of the profile of ring segment 58 with horizontal axis 53 corresponding with the profile of cladding layer 64, i.e., Δ%=0 as a reference.

The annular ring segment 58 of fiber 50 is formed on the periphery of first intermediate segment 56 and has a relative refractive index percent 74, $\Delta_4$, within the range of from about 1.1% to about 1.8%; more preferably within the range of from about 1.32% to about 1.62%; and most preferably within the range of from about 1.40% to about 1.54%. Ring segment 58 also has a width 86 within the range of from about 0.8 μm to about 1.3 μm; more preferably within the range of from about 0.90 μm to about 1.27 μm; and most preferably within the range of from about 1.05 μm to about 1.21 μm. The base width 86 of ring segment 58 is defined by the distance between the two points of intersection between the profile of ring segment 58 with horizontal axis 53 corresponding with the profile of the cladding layer 64, i.e., Δ%=0 as a reference.

The second intermediate segment 60 of the DC fiber 50 is formed on the periphery of ring segment 58 and has a relative refractive index percent, $\Delta_5$, of within the range of from about -0.1% to about 0.1%; and more preferably of within the range of from about 0.0% to about 0.1%. Second intermediate segment 60 also has an outer radius 88, $r_5$, within the range of from about 7.7 μm to about 11.5 μm; more preferably of within the range of from about 8.64 μm to about 10.56 μm; and most preferably of within the range of from about 9.12 μm to about 10.08 μm. The outer radius 88, $r_5$, is the intersection of second intermediate segment 60 and gutter segment 62. As illustrated, the outer radius 88, $r_5$, is defined by the intersection of the profile of gutter segment 62 with horizontal axis 53 corresponding with the profile of cladding layer 64, i.e., Δ%=0 as a reference.

The gutter segment 62 of the DC fiber 50 is formed on the periphery of second intermediate segment 60 and has a minimum relative refractive index percent 76, $\Delta_6$, of within the range of from about -0.13% to about -0.21%; more preferably of within the range of from about -0.15% to about -0.19%; and most preferably of within the range of from about -0.16% to about -0.17%. Gutter segment 62 also has an outer radius 90, $r_6$, within the range of from about 1.0 μm to about 13.0 μm; more preferably of within the range of from about 11.3 μm to about 12.3 μm; and most preferably of within the range of from about 11.5 μm to about 12.0 μm. The outer radius 90, $r_6$, of gutter segment 62 is the intersection of gutter segment 62 and cladding layer 64. In the illustrated example, the outer radius 90, $r_6$, is defined by the intersection of the profile of gutter segment 62 with horizontal axis 53 corresponding with the profile of cladding layer 64, i.e., Δ%=0 as a reference.

Figure 5:
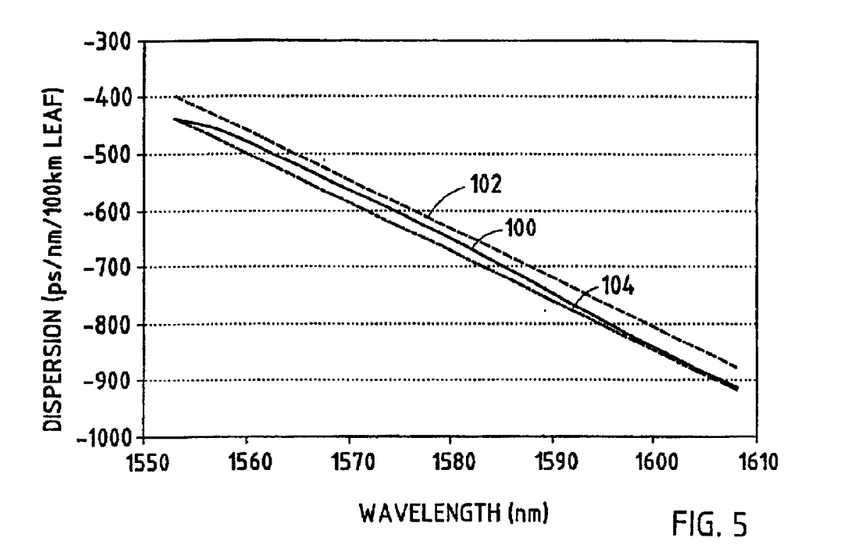
FIG. 5 is a plot of dispersion vs. wavelength for a system including 100 km of NZDSF and an embodiment of the DC fiber in accordance with the present invention.

The outer radius 90, $r_6$, of gutter segment 62 is also the inner radius of cladding layer 64. Cladding layer 64 surrounds gutter segment 62 and has a relative refractive index percent, $\Delta_c$, of approximately 0%, and an outer radius $r_c$, of about 62.5 μm. The cladding layer is preferably substantially pure silica The DC fiber 50 of the present invention exhibits a very linear dispersion slope within a wavelength band of from about 1550 nm to about 1610 nm. This overall dispersion slope is illustrated in FIG. 5, which shows overall dispersion for a 100 km span of LEAF® versus wavelength of the signal to be compensated. Specifically, FIG. 5 shows the values for overall dispersion 100, as well as the positive overall deviation 102 and negative overall deviation 104 therefrom.

Table 2 lists the calculated optical properties of the DC fiber 50 of FIG. 4 as well as the optical properties of a DC fiber similar to compensation fiber 50 of FIG. 4 but including a 0.05% updoping in each of the segments 50 through 62 and cladding layer 64.

TABLE 2

Optical Properties for Fiber of FIG. 4

| Doping Levels | 0% Updoping | 0.05% Updoping |
|---|---|---|
| Dispersion (ps/nm-km) at 1580 nm | −157 | −160 |
| Dispersion slope (ps/nm$^2$-km) at 1580 nm | −2.18 | −2.25 |
| $A_{eff}$ ($\mu m^2$) at 1580 nm | 18.3 | 18.3 |
| MFD ($\mu m$) at 1580 nm | 4.5 | 4.5 |
| Straight fiber cutoff wavelength (nm) | 2164 | 1941 |
| $LP_{02}$ Cutoff wavelength (nm) | 1818 | 1758 |
| $LP_{11}$ Cutoff wavelength (nm) | 2164 | 1941 |
| Bend loss (about 4-inch hub) dB/km at 1580 nm | $3.63 \times 10^{-35}$ | $4.69 \times 10^{-23}$ |

Figure 6:
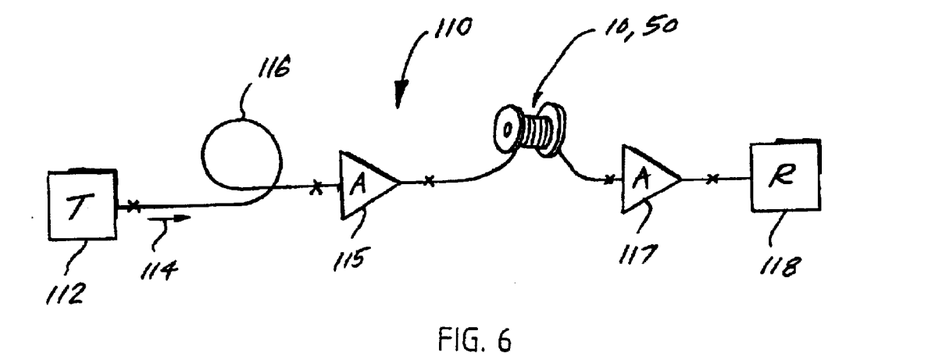
FIG. 6 is a schematic view of a fiber optical transmission system employing an DC fiber in accordance with the present invention.

A DC fiber 10 (or 50) manufactured in accordance with the present invention may be used in an optical fiber communication system 110, as shown in FIG. 6. System 110 includes an optical transmitter, T, 112 adapted to transmit an optical signal in a direction indicated by an arrow 114 through an optical wave guide transmission fiber 116 (e.g., a non-zero dispersion shifted fiber such as LEAF® fiber) and DC fiber 10, 50 which is in optical communication with transmitter 112 and transmission fiber 116. The DC fiber 10 (or 50) is in optical communication with transmission fiber 116 and also with an optical receiver 118 adapted to receive the optical signal 114. Fiber 10, 50 may be employed within system 110 in a coil form, within a box, or in any other form or packaging as known in the art. In most systems, both ends of transmission fiber 116 and DC fiber 10 (or 50) will be capable of two-way signal transmission, and transmitter 112 and receiver 118 are shown for illustration only. The transmission system 110 may include other system components such as a pre-amplifier 115 and a power amplifier 117, for example. Optionally, the amp 117 may be optically coupled with one or more additional length sections of transmission fiber rather than terminating at receiver 118. Similarly, the pre-amplifier 115 and power amplifier 117 may be combined into, or replaced by a single amplifying unit.

Figure 7:
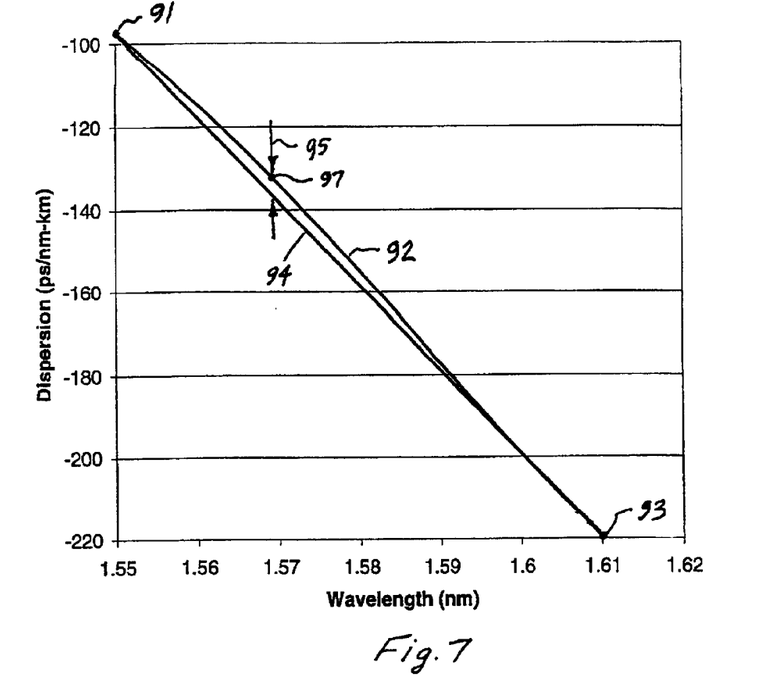
FIG. 7 is a schematic view illustrating the deviation in dispersion vs. wavelength of the DC fiber in accordance with the present invention.
Figure 8:
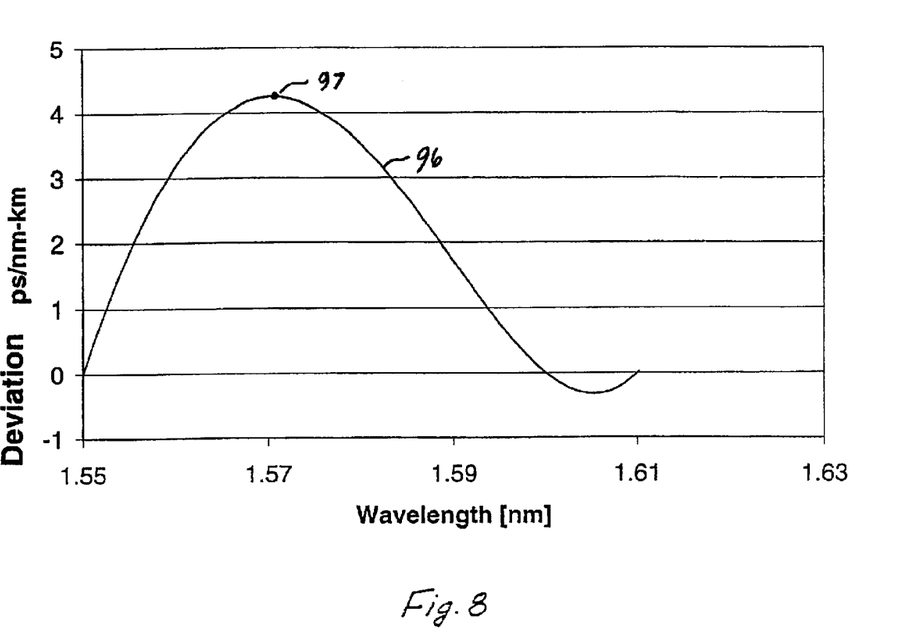
FIG. 8 is a schematic view of deviation vs. wavelength of the DC fiber of the present invention.

FIG. 7 illustrates a plot of dispersion vs. wavelength over the wavelength band from 1550 to 1610 nm. In the illustrated embodiment, the DC fiber has a refractive index profile selected to provide a dispersion having a maximum deviation of less than about 7 ps/nm-km within a wavelength band of from about 1550 nm to about 1610 nm; and more preferably less than 5 ps/nm-km within the wavelength band of from about 1550 nm to about 1610 nm. The maximum deviation is measured by locating the end points 91 and 93 at 1550 nm and 1610 nm respectively on the dispersion plot 92. A straight connecting chord line 94 is drawn connecting points 91 and 93. The maximum deviation is where the maximum vertical separation between the dispersion plot 92 and the connecting chord line 94 is located (as measured vertically along the dispersion axis as indicated by arrows labeled 95). As illustrated by the plot of deviation versus wavelength shown in FIG. 8 and the dispersion plot of FIG. 7, the maximum deviation on the plotted deviation curve 96 and dispersion plot 92 occurs at point 97. The linearity of the plot of dispersion of the DC fiber 10 (or 50) is important as it allows the dispersion of the transmission fiber to be very closely matched thereby better compensating for dispersion for in the transmission system over the entire wavelength band (1550 nm to 1610 nm).

Figure 9:
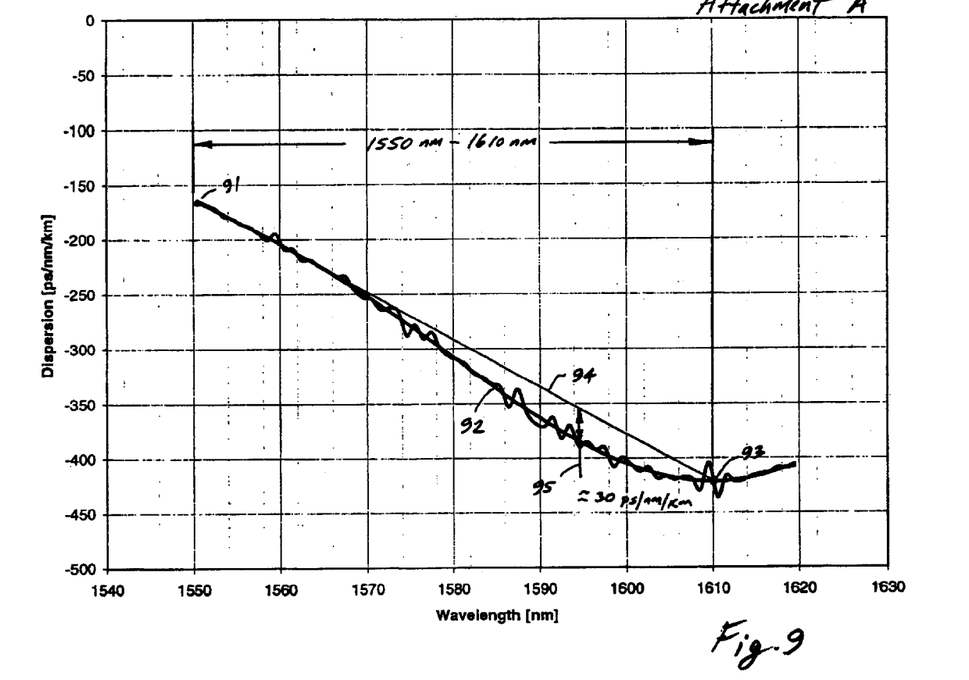
FIG. 9 is a schematic view of dispersion vs. wavelength of the DC fiber of the present invention illustrating the projected zero dispersion crossing.

FIG. 9 illustrates an extrapolation line 98 of the chord 94 interconnecting the end points 91, 93 of the dispersion plot of FIG. 7. For the DC fiber in accordance with the invention, it is desirable that this linear extrapolation of the chord 98 crosses the zero dispersion line (has a projected zero dispersion) at a point 99 located at a wavelength between 1400 nm and 1520 nm; more preferably between 1490 nm and 1510 nm.

It will be become apparent to those skilled in the art that various modifications to the preferred embodiment of the invention as described herein can be made without departing from the spirit or scope of the invention as defined by the impended claims. Thus, it is intended that the present invention covers the modifications and variations of this invention provided they come within the scope and appended claims and their equivalents.

What is claimed is:

1. A dispersion and dispersion slope compensating optical fiber, comprising:
    a segmented core and a cladding layer on the periphery of the core wherein the segmented core and the cladding layer exhibit a fiber refractive index profile that is selected to provide a dispersion of less than about −50 ps/nm-km at a wavelength of about 1580 nm having a maximum deviation of less than about 7 ps/nm-km within a wavelength band of from about 1550 nm to about 1610 nm the fiber refractive index profile has
    a central core segment having a relative refractive index;
    a depressed moat segment on a periphery of the central core segment and having a relative refractive index that is less than the relative refractive index of the central core segment, and an outer radius;
    an intermediate segment on an outer periphery of the depressed moat segment and having a relative refractive index that is less than the relative refractive index of the central core segment and greater than the relative refractive index of the depressed moat segment, and an outer radius; and
    an annular ring segment on a periphery of the intermediate segment and having a relative refractive index that is greater than the relative refractive index of the intermediate segment, and a width.

2. The optical fiber of claim 1 wherein the refractive index profile is selected to provide a dispersion having a maximum deviation of less than about 5 ps/nm-km within a wavelength band of from about 1550 nm to about 1610 nm.

3. A dispersion and dispersion slope compensating optical fiber, comprising:
    a segmented core and a cladding layer on the periphery of the core wherein the segmented core and the cladding layer exhibit a fiber refractive index profile that is selected to provide a dispersion having a maximum deviation of less than about 7 ps/nm-km within a wavelength band of from about 1550 nm to about 1610 nm wherein the refractive index profile is further selected to provide a fundamental mode bend loss of less than or equal to about 0.01 dB/km on a 4 inch diameter hub within a wavelength band from about 1550 nm to about 1610 nm.

4. The optical fiber of claim 3 wherein the refractive index profile is further selected to provide an effective area of greater than or equal to about 17 $\mu m^2$ at a wavelength of about 1580 nm.

5. The optical fiber of claim 4 wherein the refractive index profile is further selected to provide a straight fiber cut-off wavelength of less than or equal to about 2200 nm.

6. The optical fiber of claim 1 wherein the refractive index profile is further selected to provide dispersion values at 1550 nm and 1610 nm which when connected with a straight line to form a chord, an extrapolation of the chord exhibits a projected zero dispersion located at a wavelength of between about 1400 nm and 1520 nm.

7. The optical fiber of claim 6 wherein the refractive index profile is further selected to provide a projected zero dispersion located at a wavelength of between about 1490 nm and 1510 nm.

8. The optical fiber of claim 1, wherein the refractive index profile is further selected to provide a dispersion of less than about −75 ps/nm-km at a wavelength of about 1580 nm.

9. The optical fiber of claim 8, wherein the refractive index profile is further selected to provide a dispersion of less than about −120 ps/nm-km at a wavelength of about 1580 nm.

10. The optical fiber of claim 8, wherein the refractive index profile is further selected to provide a total dispersion slope of less than about −2 ps/nm$^2$-km at a wavelength of about 1580 nm.

11. A dispersion and dispersion slope compensating optical fiber, comprising:
a segmented core and a cladding layer on the periphery of the core wherein the segmented core and the cladding layer exhibit a fiber refractive index profile that is selected to provide a dispersion having a maximum deviation of less than about 7 ps/nm-km within a wavelength band of from about 1550 nm to about 1610 nm wherein the segmented core comprises:
a central core segment having a relative refractive index;
a depressed moat segment on a periphery of the central core segment and having a relative refractive index that is less than the relative refractive index of the central core segment, and an outer radius;
an intermediate segment on an outer periphery of the depressed moat segment and having a relative refractive index that is less than the relative refractive index of the central core segment and greater than the relative refractive index of the depressed moat segment, and an outer radius; and
an annular ring segment on a periphery of the intermediate segment and having a relative refractive index that is greater than the relative refractive index of the intermediate segment, and a width and wherein
the relative refractive index percent of the core segment is within a range of from about 1.1% to about 1.7%;
the relative refractive index percent of the moat segment within a range of from about −1.6% to about −0.9%;
the relative refractive index percent of the intermediate segment is within a range of from about −0.1% to about 0.1%;
the relative refractive index percent of the ring segment is within a range of from about 1.0% to about 1.9%;
the outer radius of the central core region is within a range of from about 1.7 μm to about 2.7 μm;
the outer radius of the moat segment is within a range of from about 3.4 μm to about 5.2 μm;
the outer radius of the intermediate segment is within a range of from about 4.9 μm to about 7.5 μm; and
the width of the ring segment is within a range of from about 0.7 μm to about 1.2 μm.

12. The optical fiber of claim 11 wherein
the relative refractive index percent of the central core segment is within a range of from about 1.26% to about 1.54%;
the relative refractive index percent of the moat segment is within a range of from about −1.43% to about −1.00%;
the relative refractive index percent of the intermediate segment is within a range of from about −0.10% to about 0.10%;
the relative refractive index percent of the ring segment is within a range of from about 1.40% to about 1.71%;
the outer radius of the core region is within a range of from about 1.98 μm to about 2.42 μm;
the outer radius of the moat segment is within a range of from about 3.87 μm to about 4.73 μm;
the outer radius of the intermediate segment of within a range of from about 5.58 μm to about 6.82 μm; and
the width of the ring segment is within a range of from about 0.86 μm to about 1.05 μm.

13. The optical fiber of claim 11 wherein
the relative refractive index percent of the core segment is within a range of from about 1.33% to about 1.47%;
the relative refractive index percent of the moat segment is within a range of from about −1.37% to about −1.23%;
the relative refractive index percent of the intermediate segment is within a range of from about 0.00% to about 0.10%;
the relative refractive index percent of the ring segment is within a range of from about 1.47% to about 1.63%;
the outer radius of the core region is within a range of from about 2.09 μm to about 2.31 μm;
the outer radius of the moat segment is within a range of from about 4.09 μm to about 4.52 μm;
the outer radius of the intermediate segment is within a range of from about 5.89 μm to about 6.51 μm; and
the width of the ring segment is within a range of from about 0.90 μm to about 1.00 μm.

14. The optical fiber of claim 13 wherein the refractive index profile is further selected to provide an effective area of greater than or equal to about 17 m$^2$ at a wavelength of about 1580 nm.

15. The optical fiber of claim 14 wherein the refractive index profile is further selected to provide a straight fiber cut-off wavelength of less than or equal to about 2200 nm.

16. The optical fiber of claim 15 wherein the refractive index profile is further selected to provide a dispersion of less than or equal to about −120 ps/nm-km at a wavelength of about 1580 nm.

17. A dispersion and dispersion slope compensating optical fiber, comprising:
a segmented core and a cladding layer on the periphery of the core wherein the segmented core and the cladding layer exhibit a fiber refractive index profile that is selected to provide a dispersion having a maximum deviation of less than about 7 ps/nm-km within a wavelength band of from about 1550 nm to about 1610 nm wherein the segmented core comprises:
a central core segment having a relative refractive index;
a depressed moat segment on a periphery of the central core segment and having a relative refractive index that is less than the relative refractive index of the central core segment, and an outer radius;

a first intermediate segment on a periphery of the depressed moat segment and having a relative refractive index that is less than the relative refractive index of the central core segment and greater than the relative refractive index of the depressed moat segment, and an outer radius;

an annular ring segment on a periphery of the first intermediate segment and having a relative refractive index that is greater than the relative refractive index of the first intermediate segment and less than the relative refractive index of the central core segment, and a width;

a second intermediate segment on a periphery of the ring segment and having a relative refractive index that is less than the relative refractive index of the central core segment and greater than the relative refractive index of the moat segment, and an outer radius;

a gutter segment on a periphery of the second intermediate segment and having a relative refractive index that is less than the relative refractive index of the second intermediate segment and greater than the relative refractive index of the depressed moat segment, and an outer radius.

18. The optical fiber of claim 17 wherein
the relative refractive index percent of the core segment is within a range of from about 1.2% to about 1.8%;
the relative refractive index percent of the moat segment is within a range of from about −1.2% to about −0.7%;
the relative refractive index percent of the first intermediate segment is within a range of from about −0.1% to about 0.1%;
the relative refractive index percent of the ring segment is within a range of from about 1.1% to about 1.8%;
the relative refractive index percent of the second intermediate segment is within a range of from about −0.1% to about 0.1%;
the relative refractive index percent of the gutter segment is within a range of from about −0.13% to about −0.21%;
the outer radius of the core region is within a range of from about 1.7 μm to about 2.5 μm;
the outer radius of the moat segment is within a range of from about 3.7 μm to about 5.5 μm;
the outer radius of the first intermediate segment is within a range of from about 5.1 μm to about 7.9 μm;
the width of the ring segment is within a range of from about 0.8 μm to about 1.3 μm;
the outer radius of the second intermediate segment is within a range of from about 7.7 μm to about 11.5 μm; and
the outer radius of the gutter segment is within a range of from about 11.0 μm to about 13.0 μm.

19. The optical fiber of claim 18 wherein
the relative refractive index percent of the core segment is within a range of from about 1.37% to about 1.67%;
the relative refractive index percent of the moat segment is within a range of from about −1.05% to about −0.86%;
the relative refractive index percent of the first intermediate segment is within a range of from about −0.10% to about 0.10%;
the relative refractive index percent of the ring segment is within a range of from about 1.32% to about 1.62%;
the relative refractive index percent of the second intermediate segment is within a range of from about −0.10% to about 0.10%;
the relative refractive index of the gutter segment is within a range of from about −0.15% to about −0.19%;
the outer radius of the core region is within a range of from about 1.89 μm to about 2.21 μm;
the outer radius of the moat segment is within a range of from about 4.14 μm to about 5.06 μm;
the outer radius of the first intermediate segment is within a range of from about 5.76 μm to about 7.04 μm;
the width of the ring segment is within a range of from about 0.90 μm to about 1.27 μm;
the outer radius of the second intermediate segment is within a range of from about 8.64 μm to about 10.56 μm; and
the outer radius of the gutter segment is within a range of from about 11.30 μm to about 12.30 μm.

20. The optical fiber of claim 18 wherein
the relative refractive index percent of the core segment is within a range of from about 1.44% to about 1.60%;
the relative refractive index percent of the moat segment is within a range of from about −1.00% to about −0.90%;
the relative refractive index percent of the first intermediate segment is within a range of from about −0.10% to about 0.10%;
the relative refractive index percent of the ring segment is within a range of from about 1.40% to about 1.54%;
the relative refractive index percent of the second intermediate segment is within a range of from about 0.00% to about 0.10%;
the relative refractive index percent of the gutter segment is within a range of from about −0.16% to about −0.17%;
the outer radius of the core region is within a range of from about 1.95 μm to about 2.11 μm;
the outer radius of the moat segment is within a range of from about 4.37 μm to about 4.83 μm;
the outer radius of the first intermediate segment is within a range of from about 6.08 μm to about 6.72 μm;
the width of the ring segment is within a range of from about 1.05 μm to about 1.21 μm;
the outer radius of the second intermediate segment is within a range of from about 9.12 μm to about 10.08 μm; and
the outer radius of the gutter segment is within a range of from about 11.5 μm to about 12.0 μm.

21. An optical communication system, comprising:
a transmitter adapted to transmit an optical signal;
a transmission fiber in optical communication with the transmitter and adapted to receive the optical signal;
a dispersion compensation fiber in optical communication with the transmission fiber and adapted to receive the optical signal, the dispersion compensation fiber comprising:
a segmented core; and
a cladding layer on the periphery of the core;
wherein a refractive index profile of the dispersion compensating fiber is selected to provide a total dispersion for the dispersion compensating fiber having a maximum deviation of about 7 ps/nm-km within a wavelength band of from about 1550 nm to about 1610 nm; and
a receiver in optical communication with the dispersion compensating fiber and adapted to receive the optical signal wherein the compensation fiber comprises:

a central core segment having a relative refractive index;

a depressed moat segment on a periphery of the central core segment and having a relative refractive index that is less than the relative refractive index of the central core segment, and an outer radius;

an intermediate segment on a periphery of the depressed moat segment and having a relative refractive index that is less than the relative refractive index of the central core segment and greater than the relative refractive index of the depressed moat segment, and an outer radius;

an annular ring segment on a periphery of the intermediate segment and having a relative refractive index that is greater than the relative refractive index of the central core segment, and a width; and the cladding layer on a periphery of the annular ring segment and having a relative refractive index that is less than the relative refractive index of the annular ring segment and greater than the relative refractive index of the depressed moat segment; and wherein the relative refractive index percent of the core segment is within a range of from about 1.1% to about 1.7%;

the relative refractive index percent of the moat segment is within a range of from about −1.6% to about −0.9%;

the relative refractive index percent of the intermediate segment is within a range of from about −0.1% to about 0.1%;

the relative refractive index percent of the ring segment is within a range of from about 1.0% to about 1.9%;

the outer radius of the core region is within a range of from about 1.7 μm to about 2.7 μm;

the outer radius of the moat segment is within a range of from about 3.4 μm to about 5.2 μm;

the outer radius of the intermediate segment is within a range of from about 4.9 μm to about 7.5 μm; and the width of the ring segment is within a range of from about 0.7 μm to about 1.2 μm.

22. A dispersion and dispersion slope compensating optical fiber; comprising:

a central core segment having a relative refractive index;

a depressed moat segment on a periphery of the central core segment and having a relative refractive index that is less than the relative refractive index of the central core segment, and an outer radius;

a first intermediate segment on a periphery of the depressed moat segment and having a relative refractive index that is less than the relative refractive index of the central core segment and greater than the relative refractive index of the depressed moat segment, and an outer radius;

an annular ring segment on a periphery of the first intermediate segment and having a relative refractive index that is greater than the relative refractive index of the first intermediate segment and less than the relative refractive index of the central core segment, and a width;

a second intermediate segment on a periphery of the ring segment and having a relative refractive index that is less than the relative refractive index of the central core and greater than the relative refractive index of the moat segment;

a gutter segment on a periphery of the second intermediate segment and having a relative refractive index that is less than the relative refractive index of the second intermediate segment and greater than the relative refractive index of the depressed moat segment, and an outer radius; and a cladding layer on a periphery of the gutter segment and having a relative refractive index that is less than the relative refractive index of the annular ring segment and greater than the relative refractive index of the depressed moat segment; and wherein the relative refractive index percent of the core segment is within a range of from about 1.2% to about 1.8%;

the relative refractive index percent of the moat segment is within a range of from about −1.2% to about −0.7%;

the relative refractive index percent of the first intermediate segment is within a range of from about −0.1% to about 0.1%;

the relative refractive index percent of the ring segment is within a range of from about 1.1% to about 1.8%;

the relative refractive index percent of the second intermediate segment is within a range of from about −0.1% about 0.1%;

the relative refractive index percent of the gutter segment is within a range of from about −0.13% to about −0.21%;

the outer radius of the core region is within a range of from about 1.7 μm to about 2.5 μm;

the outer radius of the moat segment is within a range of from about 3.7 μm to about 5.5 μm;

the outer radius of the first intermediate segment is within a range of from about 5.1 μm to about 7.9 μm;

the width of the ring segment is within a range of from about 0.9 μm to about 1.4 μm;

the outer radius of the second intermediate segment is within a range of from about 7.7 μm to about 11.5 μm; and the outer radius of the gutter segment is within a range of from about 11.0 μm to about 13.0 μm.

23. A dispersion compensating optical fiber; comprising:

a refractive index profile having a central core segment having a positive relative refractive index;

a depressed moat segment on a periphery of the central core segment and having a relative refractive index that is more negative that −1.2%; and an annular ring segment outward from the depressed moat segment and having a relative refractive index that is greater than 1.2%.

24. The optical fiber of claim 23 wherein the relative refractive index of the central core segment is greater than 1.1%.

25. The optical fiber of claim 24 wherein the relative refractive index of the central core segment is greater than 1.44%.

26. The optical fiber of claim 23 wherein an outer radii of the central core segment is within a range from about 1.7 μm to about 2.7 μm.

27. The optical fiber of claim 26 wherein an outer radii of the depressed moat segment is within a range from about 3.4 μm to about 5.2 μm.

28. The optical fiber of claim 23 wherein the refractive index profile is selected to provide a dispersion having a maximum deviation of less than about 7 ps/nm-km within a wavelength band of from about 1550 nm to about 1610 nm.

29. The optical fiber of claim 28 further comprising a maximum deviation of less than about 5 ps/nm-km within a wavelength band of from about 1550 nm to about 1610 nm.

30. The optical fiber of claim 29 wherein the refractive index profile is further selected to provide a fundamental mode bend loss of less than or equal to about 0.01 dB/km on a 4 inch diameter hub within a wavelength band from about 1550 nm to about 1610 nm.

31. The optical fiber of claim 23 wherein the refractive index profile is further selected to provide an effective area of greater than or equal to about 17 $\mu m^2$ at a wavelength of about 1580 nm.

32. The optical fiber of claim 23 wherein the refractive index profile is further selected to provide a straight fiber cut-off wavelength of less than or equal to about 2200 nm.

33. The optical fiber of claim 23 wherein the refractive index profile is further selected to provide a dispersion of less that −50 ps/nm-km at a wavelength of about 1580 nm.

34. The optical fiber of claim 33 wherein the refractive index profile is further selected to provide a dispersion of less that −75 ps/nm-km at a wavelength of about 1580 nm.

35. The optical fiber of claim 33 wherein the refractive index profile is further selected to provide a dispersion of less that −120 ps/nm-km at a wavelength of about 1580 nm.

36. The optical fiber of claim 35 wherein the refractive index profile is further selected to provide a total dispersion slope more negative that −2 ps/nm$^2$-km at 1580 nm.

37. The optical fiber of claim 23 wherein the refractive index profile is further selected to provide dispersion values at 1550 nm and 1610 nm which when connected with a straight line to form a chord, an extrapolation of the chord exhibits a projected zero dispersion located at a wavelength between about 1400 nm and 1520 nm.

38. The optical fiber of claim 32 wherein the refractive index profile is further selected to provide a projected zero dispersion located at a wavelength of between about 1490 nm and 1510 nm.

39. A dispersion and dispersion slope compensating optical fiber, comprising:

a segmented core and a cladding layer on the periphery of the core wherein the segmented core and the cladding layer exhibit a fiber refractive index profile that is selected to provide a dispersion of less than about −50 ps/nm-km and dispersion slope less than about −2.0 ps/nm$^2$-km at a wavelength of about 1580 nm having a maximum deviation of less than about 5 ps/nm-km within a wavelength band of from about 1550 nm to about 1610 nm.

* * * * *

UNITED STATES PATENT AND TRADEMARK OFFICE
CERTIFICATE OF CORRECTION

PATENT NO. : 6,751,390 B2
DATED : June 15, 2004
INVENTOR(S) : Wood William et al.

It is certified that error appears in the above-identified patent and that said Letters Patent is hereby corrected as shown below:

Column 14,
Line 42, "of greater then or equal to about 17 m$^2$ at a wavelength of" should be -- of greater than or equal to about 17 $\mu$m$^2$ at a wavelength of"

Column 15,
Line 53, "19. The optical fiber of claim 18 wherein" should be -- 19. The optical fiber of claim 17 wherein --

Column 16,
Line 16, "20. The optical fiber of claim 18 wherein" should be -- 20. The optical fiber of claim 17 wherein --

Column 18,
Line 45, "that is more negative that -1.2%; and" should be -- that is more negative than -1.2%; and"

Column 19,
Line 15, "less that -50 ps/nm-km at a wavelength of about 1580 nm." should be -- less than -50 ps/nm-km at a wavelength of about 1580 nm. --
Line 18, "less that -75 ps/nm-km at a wavelength of about 1580 nm." should be -- less than -75 ps/nm-km at a wavelength of about 1580 nm. --
Line 21, "less that -120 ps/nm-km at a wavelength of about 1580 nm." should be -- less than -120 ps/nm-km at a wavelength of about 1580 nm. --
Line 24, "slope more negative that -2 ps/nm$^2$-km at 1580 nm." should be -- slope more negative than -2 ps/nm$^2$-km at 1580 nm. --

UNITED STATES PATENT AND TRADEMARK OFFICE
CERTIFICATE OF CORRECTION

PATENT NO. : 6,751,390 B2
DATED : June 15, 2004
INVENTOR(S) : Wood William et al.

It is certified that error appears in the above-identified patent and that said Letters Patent is hereby corrected as shown below:

Column 20,
Line 7, "38. The optical fiber of claim 32 wherein the refractive" should be -- 38. The optical fiber of claim 37 wherein the refractive --

Signed and Sealed this

Thirtieth Day of November, 2004

JON W. DUDAS
*Director of the United States Patent and Trademark Office*